(12) United States Patent
Rupprecht et al.

(10) Patent No.: US 9,718,965 B2
(45) Date of Patent: Aug. 1, 2017

(54) ZINC-MAGNESIUM ANTICORROSION PIGMENTS, ANTICORROSION PAINT, AND METHOD FOR THE PRODUCTION OF SAID ANTICORROSION PIGMENTS

(71) Applicant: Eckart GmbH, Hartenstein (DE)

(72) Inventors: Markus Rupprecht, Edelsfeld (DE); Christian Wolfrum, Erlangen (DE); Dominik Pfammatter, Susten (CH); Sandra Hubner, Velden (DE); Laurent Constantin, Arbaz (CH); Guy Decelles, Fully (CH); Thomas Voit, Auerbach (DE); Horst Hafner, Vorra (DE)

(73) Assignee: ECKART GMBH, Hartenstein (DE)

( * ) Notice: Subject to any disclaimer, the term of this patent is extended or adjusted under 35 U.S.C. 154(b) by 70 days.

(21) Appl. No.: 14/422,441

(22) PCT Filed: Aug. 20, 2013

(86) PCT No.: PCT/EP2013/067332
§ 371 (c)(1),
(2) Date: Feb. 19, 2015

(87) PCT Pub. No.: WO2014/029779
PCT Pub. Date: Feb. 27, 2014

(65) Prior Publication Data
US 2015/0218388 A1    Aug. 6, 2015

(30) Foreign Application Priority Data
Aug. 20, 2012    (DE) .................. 10 2012 107 634

(51) Int. Cl.
C09D 5/08    (2006.01)
C09D 5/10    (2006.01)
(Continued)

(52) U.S. Cl.
CPC ............ *C09D 5/084* (2013.01); *B22F 1/0055* (2013.01); *B22F 9/04* (2013.01); *C09C 1/62* (2013.01);
(Continued)

(58) Field of Classification Search
CPC ....................................................... C22C 18/00
See application file for complete search history.

(56) References Cited

U.S. PATENT DOCUMENTS 2,877,126 A    3/1959    Whitby
8,114,527 B2    2/2012    Nagasawa et al.
(Continued)

FOREIGN PATENT DOCUMENTS

DE    1010315775 A1    10/2004
DE    102007021602 A1    11/2008
(Continued)

OTHER PUBLICATIONS

English Translation of Plagemann et al. (DE 10 2009 052399), Google Patents, accessed Aug. 24, 2015.*
(Continued)

*Primary Examiner* — Humera Sheikh
*Assistant Examiner* — Lucas Wang
(74) *Attorney, Agent, or Firm* — The Webb Law Firm

(57) ABSTRACT

The present invention relates to platelet-shaped zinc-magnesium pigments, wherein the platelet-shaped zinc-magnesium pigments comprise the 40.8 to 67.8 mol % of zinc, 32.2 to 59.2 mol % of magnesium and 0 to 7 mol % of Mn, Li, Be, Y, Sn, Al, Ti, Fe, Cu and mixtures thereof, based in each case on the total molar amount of the elements Zn, Mg, Mn, Be, Y, Li, Sn, Al, Ti, Fe and Cu, where the molar percentages add up to 100 mol %, and the median thickness $h_{50}$ of the pigments is less than 1 μm. The invention further relates to the use and production of these pigments.

19 Claims, 4 Drawing Sheets

(51) Int. Cl.

| | |
|---|---|
| *C22C 1/04* | (2006.01) |
| *C22C 18/00* | (2006.01) |
| *C23C 30/00* | (2006.01) |
| *C09C 1/62* | (2006.01) |
| *C09D 7/12* | (2006.01) |
| *B22F 1/00* | (2006.01) |
| *B22F 9/04* | (2006.01) |
| *C08K 3/00* | (2006.01) |
| *C08K 3/08* | (2006.01) |

(52) U.S. Cl.
CPC ............... *C09D 5/10* (2013.01); *C09D 5/106* (2013.01); *C09D 7/1291* (2013.01); *C22C 1/0408* (2013.01); *C22C 1/0483* (2013.01); *C22C 18/00* (2013.01); *C23C 30/005* (2013.01); *B22F 2998/10* (2013.01); *C01P 2004/03* (2013.01); *C01P 2004/20* (2013.01); *C01P 2004/22* (2013.01); *C01P 2004/51* (2013.01); *C01P 2004/54* (2013.01); *C08K 3/0033* (2013.01); *C08K 2003/0893* (2013.01); *Y10T 428/12736* (2015.01)

(56) References Cited

U.S. PATENT DOCUMENTS

| | | |
|---|---|---|
| 2004/0191555 A1 | 9/2004 | Germano |
| 2007/0128351 A1* | 6/2007 | Nanna ................ C08G 18/10 427/180 |
| 2010/0276293 A1 | 11/2010 | Priewasser et al. |
| 2011/0207833 A1* | 8/2011 | Albrecht ............... C09C 1/0012 514/772.6 |
| 2013/0000372 A1* | 1/2013 | Krech ................... C09D 5/084 72/46 |

FOREIGN PATENT DOCUMENTS

| | | |
|---|---|---|
| DE | 102009028667 A1 | 3/2011 |
| DE | 102009052399 A1 | 5/2011 |
| EP | 2060345 A1 | 5/2009 |
| EP | 2246396 A1 | 11/2010 |
| GB | 846904 A | 8/1960 |
| JP | H09-268265 A | 10/1997 |
| JP | H11-343422 A | 12/1999 |
| JP | 2000080309 A | 3/2000 |
| JP | 2001-230108 A | 8/2001 |
| JP | 2008-133464 A | 6/2008 |
| JP | 2008223137 A | 9/2008 |
| JP | 2011037949 A | 2/2011 |
| KR | 1020100023855 A | 3/2010 |
| WO | 2008125610 A1 | 10/2008 |
| WO | 2010043708 A1 | 4/2010 |

OTHER PUBLICATIONS

English Translation of Nagasawa et al. (JP 2007-128351), EPO, accessed Aug. 24, 2015.*

Battocchi et al. "Electrochimal behaviour of a Mg-rich primer in the protection of Al alloys" Corrosion Science, Oxford GB vol. 48, pp. 1292-1306.

* cited by examiner

ZINC-MAGNESIUM ANTICORROSION PIGMENTS, ANTICORROSION PAINT, AND METHOD FOR THE PRODUCTION OF SAID ANTICORROSION PIGMENTS

CROSS-REFERENCE TO RELATED APPLICATIONS

This application is the U.S. national phase of International Application No. PCT/EP2013/067332 filed Aug. 20, 2013, and claims priority to German Patent Application No. 10 2012 107 634.0 filed Aug. 20, 2012, the disclosures of each of which are hereby incorporated in their entirety by reference.

BACKGROUND OF THE INVENTION

Field of the Invention

The present invention relates to platelet-shaped anticorrosion pigments, to an anticorrosion coating comprising the inventive anticorrosion pigments, to an article coated with the inventive anticorrosion pigments or with the inventive anticorrosion coating, to a process for producing the inventive platelet-shaped anticorrosion pigments, and to the use of the inventive anticorrosion pigments.

Corrosion generally refers to a chemical or electrochemical reaction of a metallic material with components from the environment. Corrosion may lead, for example, to oxidation of an article, for example a motor vehicle body, an aircraft fuselage, a bridge, etc. Corrosion of iron is also called rusting. As well as iron, a multitude of further metals or alloys can also corrode, and therefore be oxidized, for example aluminum or aluminum alloys.

Corrosion causes damage to buildings, motor vehicles, ships, aircraft, etc., which can result in these articles being unable to function.

If, for example, various metals having different electrochemical potential come into contact under moist conditions, for example in the presence of salt water, an electrochemical cell can thus arise. This contact results in oxidation of the base metal.

This effect can be utilized for corrosion protection, by applying a base metal as sacrificial anode to a more noble metal which is to be protected.

Under the action of moisture, the sacrificial anode is dissolved by oxidation and the more noble metal to be protected remains intact.

For example, ship's propellers made from aluminum bronze which come into contact with aggressive salt water are protected by positioning sacrificial anode blocks of zinc on the ship's propeller and along the ship's hull.

Description of Related Art

WO 2008/125610 A1 discloses a coating composition comprising zinc-bismuth alloy particles. The zinc content is at least 95% by weight, preferably at least 98% by weight. The bismuth content is within a range from 0.05% to 0.7% by weight.

WO 2010/043708 A1 discloses a method for electrochemical corrosion protection of a metallic surface, wherein there is a difference in the metal particle concentration and/or the metal particle composition at the interface facing the workpiece to be protected from corrosion and the interface facing away from the workpiece. Metallic particles used may be a multitude of different particles, for example zinc, aluminum, tin, magnesium, nickel, etc., in the form of platelets, lamellae, grains or dust.

KR 2010/023855 A discloses an anticorrosion pigment consisting, for example, of a zinc-magnesium alloy or an aluminum-magnesium alloy. In the pigments composed of the zinc-magnesium alloy, the zinc content is within a range from 90% to 99.5% by mass, and the magnesium content within a range from 10% to 0.5% by mass. Exceptionally preferably, the alloy consists of 98% by mass of zinc and 2% by mass of magnesium.

DE 10 2009 028 667 A1 discloses an anticorrosion pigment having a core-shell structure, wherein the core consists of one or more metal particles. This core has been provided with a shell having hydrophobic groups on its exterior side. The metal particles are selected from the group consisting of magnesium, zinc and aluminum. Alternatively, it is also possible to use metal alloy in the form of metal particles having a main constituent which is one of magnesium, zinc and aluminum. The core having one or more metal particles is spherical in shape.

GB 846,904 discloses a binary zinc-magnesium alloy containing 10% by weight of magnesium. This zinc-magnesium alloy is in the form of bars which are first crushed mechanically and then ground in a ball mill down to a size of 10 μm. The resultant product is in powder form.

DE 10 2007 021 602 A1 discloses zinc-magnesium alloy particles without detailed specification as anticorrosion pigments.

EP 2 246 396 A1 discloses the use of zinc-nickel, zinc-tin, zinc-iron, zinc-aluminum and zinc-aluminum-magnesium alloy as metal powder for use in corrosion protection.

U.S. Pat. No. 2,877,126 discloses the use of a metal powder composed of a binary magnesium-zinc alloy for corrosion protection. The proportion of magnesium therein is within a range between 15% and 30% by weight, and the proportion of zinc within a range from 70% to 85% by weight.

Platelet-shaped zinc pigments and zinc alloy pigments such as zinc-aluminum alloy pigments and zinc-tin alloy pigments are commercially available. They are manufactured and sold, for example, by Eckart Suisse. They are manufactured by grinding zinc powder in ball mills in petroleum spirit and typically stearic acid as lubricant. However, pure ZnMg alloy particles are currently available only in approximately spherical form obtainable from atomization. This is attributed to the fact that these particles are very brittle and are more likely to be crushed than formed in the grinding operation under standard conditions.

US 2004/0191555 A1 discloses anticorrosion pigments based on particulate zinc which may be alloyed with aluminum, tin, magnesium, nickel, cobalt, manganese and mixtures thereof.

EP 2 060 345 A1 discloses zinc alloy particles for use in anticorrosion paints. The zinc alloy particles may contain 0.01% to 30% by weight of magnesium. The aspect ratio of the zinc alloy particles must be between 1 and 1.5. Even an aspect ratio of more than 2 has been found to be disadvantageous.

U.S. Pat. No. 8,114,527 B2 discloses an anticorrosion coating comprising zinc alloy particles which may contain 0.1% to 30% by weight of magnesium. The anticorrosion coating contains the zinc alloy particles in a bimodal particle size distribution. The fine fraction has a particle size diameter of 0.05 to 5 μm and the coarse fraction a particle size diameter of 6 to 100 μm.

In principle, in corrosion protection, the use of platelet-shaped pigments is advantageous since platelet-shaped pigments, unlike pigments having spherical or irregular geometries, have a barrier effect after application to the article to be protected from corrosion.

Pure Zn particles can be shaped into a platelet shape, but the electrochemical potential of pure zinc is too low for such pigments to be usable as sacrificial anode for particular metals or alloys such as aluminum and alloys thereof. Alloy pigments such as $ZnMg_{26}$ do have sufficient electrochemical potential, but are very brittle and therefore break up extremely easily in the attempt to grind them by standard methods. For example, GB 846,904 discloses that an end product in powder form is obtained by grinding zinc-magnesium alloy particles. In this powder form, the comminuted zinc-magnesium particles are present with spherical and/or irregular geometry. Anticorrosion pigments such as chromates have been found to be highly efficient over many years in applications such as the aerospace sector, but future use appears to be impossible because of their toxicity. Accordingly, there is a need to provide novel anticorrosion pigments which, for example, offer improved properties compared to the known ZnMg particles and/or can serve as a replacement for strontium chromate, for example, in fields of application such as the aerospace sector.

SUMMARY OF THE INVENTION

In some examples, there is provided a platelet-shaped zinc-magnesium pigment, comprising 40.8 to 67.8 mol % of zinc, 32.2 to 59.2 mol % of magnesium and 0 to 7 mol % of at least one metal selected from the group consisting of Mn, Li, Be, Y, Sn, Al, Ti, Fe, Cu and mixtures thereof, based upon the total molar amount of Zn, Mg, Mn, Be, Y, Li, Sn, Al, Ti, Fe and Cu, wherein the molar percentages add up to 100 mol %, and the median thickness $h_{50}$ of the pigments is less than 1 μm.

In some examples, there is provided an anticorrosion coating, wherein the anticorrosion coating comprises the inventive zinc-magnesium pigment.

In some examples, there is provided an article, wherein the article comprises the inventive zinc-magnesium pigment.

In some examples, there is provided an anticorrosion coating comprising the inventive zinc-magnesium pigment.

In some examples, there is provided an article, wherein the article comprises aluminium or aluminium alloy protected by the use of the inventive zinc-magnesium pigment.

In some examples, there is provided a process for producing platelet-shaped anticorrosion pigments according to claim 1, wherein the process comprises: mechanical forming of non-platelet-shaped zinc-magnesium pigments comprising 40.8 to 67.8 mol % of Zn, 32.2 to 59.2 mol % of Mg and 0 to 7 mol % of at least one metal selected from the group consisting of Mn, Li, Be, Y, Sn, Al, Ti, Fe, Cu and mixtures thereof, based upon the total molar amount of Zn, Mg, Mn, Be, Y, Li, Sn, Al, Ti, Fe and Cu, wherein the molar percentages add up to 100 mol %, and wherein an energy input of at least 2500 kJ per kg of platelet-shaped zinc-magnesium particles is effected at a rate of at least 600 kJ per kg of platelet-shaped zinc-magnesium particles per hour.

DETAILED DESCRIPTION

Figure 1:
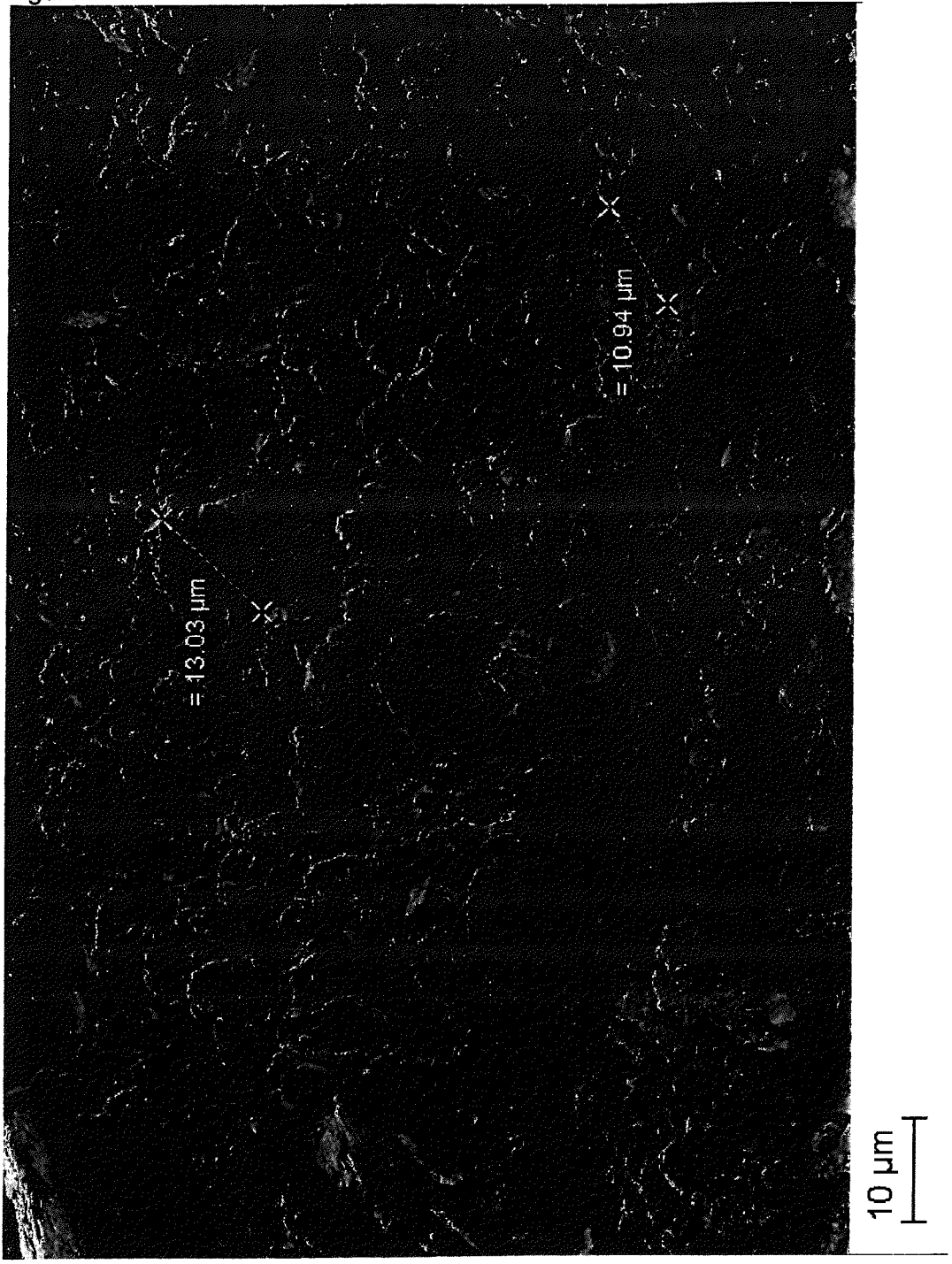
FIG. 1 depicts a scanning electron micrograph of platelet-shaped pigments according to Example 2.

It is an object of the present invention to provide improved corrosion protection, especially for aluminum or aluminum alloys. More particularly, anticorrosion pigments which can be applied to an article which is to be protected from corrosion with a relatively thin pigment thickness are to be provided, where the pigment thickness should be well below 1 μm.

The object underlying the present invention is achieved by provision of platelet-shaped zinc-magnesium pigments, wherein the platelet-shaped anticorrosion pigments comprise 40.8 to 67.8 mol % of zinc, 32.2 to 59.2 mol % of magnesium and 0 to 7 mol % of Mn, Li, Be, Y, Sn, Al, Ti, Fe, Cu and mixtures thereof, based in each case on the total molar amount of the elements Zn, Mg, Mn, Be, Y, Li, Sn, Al, Ti, Fe and Cu, where the molar percentages add up to 100 mol %.

It is preferable here that the proportions of Mn, Li, Be, Y or Sn, especially Mn, are less than 0.18 mol %, more preferably less than 0.15 mol %, even more preferably less than 0.12 mol % and most preferably less than 0.09 mol %. It is especially preferable that the proportion of Mn, Li, Be, Y, Sn and mixtures thereof is less than 0.18 mol %, more preferably less than 0.15 mol %, even more preferably less than 0.12 mol %. Most preferably, these constituents are present as trace constituents at most.

According to the invention, the proportion of the constituents Mn, Li, Be, Y, Sn, Al, Ti, Fe, Cu and mixtures thereof is in the range from 0 to 7 mol %, preferably in the range from 0 to 6.2 mol %, more preferably in the range from 0 to 5.3 mol % and even more preferably in the range from 0 to 4.6 mol %, based in each case on the total molar amount of the elements Zn, Mg, Mn, Be, Y, Li, Sn, Al, Ti, Fe and Cu.

In addition, in further embodiments, the proportion of Cu in the inventive platelet-shaped zinc-magnesium pigments is preferably not more than 1.6 mol %, more preferably not more than 1.2 mol %, even more preferably not more than 0.9 mol % and even more preferably not more than 0.4 mol %, where the molar percentages are based on the total molar amount of the elements Zn, Mg, Mn, Be, Y, Li, Sn, Al, Ti, Fe and Cu. It may be especially preferable that copper can be detected only as a trace constituent, if at all.

Examples of further constituents present are metallic, semimetallic or nonmetallic impurities or, for example, oxygen present in a superficial oxide layer. More particularly, it may be preferable that, as well as the aforementioned specified constituents, not more than 2% by weight, preferably not more than 1.5% by weight, more preferably not more than 1% by weight and even more preferably only trace constituents of other substances apart from oxygen are detectable. The percentages by weight here are based on the zinc alloy pigment. It will be appreciated that no substances which have been dried, for example, only at the surface of the zinc-magnesium alloy pigments because of the drying-out of a corresponding paste are included.

The alloy constituents can be determined by means of various methods known to those skilled in the art, the exact selection of the corresponding methods being influenced by the constituents to be determined and the amounts thereof. For example, the person skilled in the art has a preference for various methods in order to determine the amount of specific substances present as a main constituent or trace constituent. Examples of test methods typically used by the person skilled in the art are ICP (inductively coupled plasma), for example coupled to MS (mass spectrometry) or OES (optical emission spectrometry), F-AES (flame atomic emission spectrophotometry), MPT-AES (microwave plasma torch atomic emission spectrometry), AAS (atomic absorption spectrometry), etc. In the course of sample preparation, substances adhering to the surface are thoroughly removed here. The person skilled in the art will be aware that slight variations in the measurement results can occur, and so the determination of several samples, for example about 10 samples, preferably 10 samples, may be necessary.

Zinc-magnesium pigments in the context of the present invention are characterized in that they consist principally of a zinc-magnesium alloy. More particularly, the aforementioned specified constituents Zn, Mg, Mn, Be, Y, Li, Sn, Al, Ti, Fe and Cu constitute at least 93% by weight, preferably at least 95% by weight, more preferably at least 96% by weight, even more preferably at least 98% by weight and most preferably at least 99% by weight of the inventive zinc-magnesium pigments, based on the total weight of the zinc-magnesium pigments. Examples of further constituents present are metallic, semimetallic or nonmetallic impurities or, for example, oxygen present in a superficial oxide layer. More particularly, it may be preferable that, aside from the aforementioned specified constituents, only trace constituents of other substances aside from oxygen are detectable. The percentages by weight here are based on the zinc alloy pigment. It will be appreciated that no substances which have been dried, for example, only at the surface of the zinc-magnesium pigments because of the drying-out of a corresponding paste are included.

Preferred embodiments are specified in the dependent claims 2 to 10.

The object underlying the present invention is likewise achieved by provision of an anticorrosion coating comprising the inventive anticorrosion pigments.

The object of the present invention is also achieved by provision of an article, wherein the article includes the inventive anticorrosion pigments or an inventive anticorrosion coating.

Preferred developments of the inventive article are specified in claims 14 and 15.

The object of the invention is also achieved by provision of a process for producing platelet-shaped anticorrosion pigments as claimed in any of claims 1 to 10, wherein the process includes the following step:

mechanical forming of non-platelet-shaped zinc-magnesium particles comprising 40.8 to 67.8 mol % of zinc, 32.2 to 59.2 mol % of magnesium and 0 to 7 mol % of Mn, Li, Be, Y, Sn, Al, Ti, Fe, Cu and mixtures thereof, based in each case on the total molar amount of the elements Zn, Mg, Mn, Be, Y, Li, Sn, Al, Ti, Fe and Cu, where the molar percentages add up to 100 mol %, where an energy input of at least 2500 kJ per kg of platelet-shaped zinc-magnesium particles is effected at a rate of at least 600 kJ per kg of platelet-shaped zinc-magnesium particles per hour. In this context, the proportion of Mn, Li, Be, Y, Sn and mixtures thereof is preferably less than 0.18 mol %, more preferably less than 0.15 mol %, based in each case on the total molar amount of the elements Zn, Mg, Mn, Be, Y, Li, Sn, Al, Ti, Fe and Cu.

The energy input can be determined, for example, by means of measuring instruments in the unit in question. Alternatively, the energy input can be determined, for example, according to formula (I)

$$E_m(t) = \frac{\int_0^t (P(\tau) - P_0)\,d\tau}{m_P}. \quad \text{formula (I)}$$

In this formula, $E_m(t)$ is the energy input at time t, $P(\tau)$ is the power being introduced into the unit in question at time $\tau$, $P_0$ is the power introduced into the unit in the absence of non-spherical metal particles (idling power) and mp is the mass of the metal particles. To determine the power introduced, for example, it is possible to determine the amount of power required to drive an electric motor. The use of a stirred ball mill is especially preferred.

The rate of energy input in the process according to the invention is at least 600 kJ/kg·h, preferably at least 680 kJ/kg·h, more preferably at least 730 kJ/kg·h, even more preferably at least 800 kJ/kg·h, and most preferably at least 835 kJ/kg·h. It is typically sufficient here to form an average value over the entire grinding period. In the case of combination of high-energy grinding periods with, for example, longer continued running times at, for example, less than 100 kJ/kg·h, especially at less than 10 kJ/kg·h, the inventive forming, however, is brought about primarily by the high-energy grinding periods. It is therefore especially preferable that the 2500 kJ per kg of platelet-shaped zinc-magnesium particles or the absolute energy inputs further specified herein have been introduced in grinding periods with at least 600 kJ/kg·h, preferably at least 680 kJ/kg·h, more preferably at least 730 kJ/kg·h, even more preferably at least 800 kJ/kg·h, and most preferably at least 835 kJ/kg·h.

In addition, the energy input in the process according to the invention is at least 2500 kJ per kg of platelet-shaped zinc-magnesium particles, preferably at least 3300 kJ per kg of platelet-shaped zinc-magnesium particles, more preferably at least 3700 kJ per kg of platelet-shaped zinc-magnesium particles, even more preferably at least 4250 kJ per kg of platelet-shaped zinc-magnesium particles and most preferably at least 4700 kJ per kg of platelet-shaped zinc magnesium particles.

The object is also achieved by the use of zinc-magnesium particles as claimed in any of claims 1 to 10 in the protection of an article preferably consisting of aluminum or an aluminum alloy or including aluminum or an aluminum alloy from corrosion.

The inventors have found that, surprisingly, the provision of platelet-shaped zinc-magnesium pigments comprising 40.8 to 67.8 mol % of zinc, 32.2 to 59.2 mol % of magnesium and 0 to 7 mol % of Mn, Li, Be, Y, Sn, Al, Ti, Fe, Cu and mixtures thereof, based in each case on the total molar amount of the elements Zn, Mg, Mn, Be, Y, Li, Sn, Al, Ti, Fe and Cu, where the molar percentages add up to 100 mol %, Zn, Mg, Mn, Be, Y, Li, Sn, Al, Ti, Fe and Cu constitute at least 93% by weight of the zinc-magnesium pigment, based on the total weight thereof, and the median thickness $h_{50}$ of the pigments is less than 1 μm, enable the provision of improved corrosion protection. It is especially preferable here that the proportion of Mn, Li, Be, Y, Sn and mixtures thereof is less than 0.18 mol %, more preferably less than 0.15 mol %.

To date, it has been possible to provide binary zinc-magnesium alloys in finely divided form only in the form of powders, the powder particles having spherical or irregular geometries. As disclosed in GB 846,904, grinding of zinc-magnesium alloy particles gives an end product in powder form. In this powder form, the comminuted zinc-magnesium particles are present with spherical and/or irregular geometry. The reason for this is that zinc-magnesium alloys are not very ductile, but rather brittle. The effect of the brittleness of the zinc-magnesium alloys is that the alloy has only poor plastic formability, and that the alloys, with use of standard conditions, break up into smaller particles before plastic deformation occurs.

The inventors have found that, surprisingly, a rapid and high energy input can achieve substantial plastic deformation, such that platelet-shaped zinc-magnesium pigments can be obtained even with such a brittle alloy. It has been found to be particularly advantageous here to use a stirred ball mill.

The provision of platelet-shaped zinc-magnesium pigments based on the zinc-magnesium alloy used in accordance with the invention having a proportion of 40.8 to 67.8 mol % of zinc, 32.2 to 59.2 mol % of magnesium and 0 to 7 mol % of Mn, Li, Be, Y, Sn, Al, Ti, Fe, Cu and mixtures thereof, based in each case on the total molar amount of the elements Zn, Mg, Mn, Be, Y, Li, Sn, Al, Ti, Fe and Cu, where the molar percentages add up to 100 mol %, enables the provision of improved corrosion protection. In this context, where the proportion of Mn, Li, Be, Y, Sn and mixtures thereof is preferably less than 0.18 mol %, more preferably less than 0.15 mol %, based in each case on the total molar amount of the elements Zn, Mg, Mn, Be, Y, Li, Sn, Al, Ti, Fe and Cu.

Under standard conditions (25° C., 1013.25 mbar, pH 0), zinc has a standard electrochemical potential of −0.76 V. Magnesium under standard conditions has a standard electrochemical potential of −2.362 V. Therefore, magnesium has a more negative standard electrochemical potential than zinc. In the case of a proportion of 32.3 to 59.2 mol % of magnesium in the zinc-magnesium alloy for use in accordance with the invention, the standard electrochemical potential of the platelet-shaped zinc-magnesium pigments is lowered below that of pure zinc. Exceptionally advantageously, the chemical reactivity of the zinc-magnesium alloy is not increased too significantly by the proportion of magnesium. Too great a reactivity of zinc-magnesium pigments leads to rapid consumption of the zinc-magnesium pigments and, as a result, to a greater time restriction in corrosion protection.

It has been found that, with a proportion of 32.3 to 59.2 mol % of magnesium in the zinc-magnesium alloy for use in accordance with the invention, improved corrosion protection is firstly obtained because of the proportion of magnesium, and sufficiently long-lived corrosion protection can secondly be provided.

The substances present in the inventive zinc-magnesium alloys alongside Zn, Mg, Mn, Be, Y, Li, Sn, Al, Ti, Fe and Cu may be nonmetals, semimetals and nonmetals. Examples of the aforementioned semimetals are B, Ge and Si. Examples of the metals are lead, calcium, strontium, barium, sodium, potassium, bismuth, indium, cerium, tellurium, silver, mercury, iron, cobalt, nickel, chromium, niobium, vanadium, molybdenum, tantalum, osmium, tungsten, zirconium, gold, platinum, cadmium, lanthanum, gallium. Examples of corresponding nonmetals are carbon, nitrogen and oxygen. These substances may have been present, for example, as impurities in the metals used. Nonmetals we oxygen may be bound, for example, in the form of an oxide layer on the surface.

Particularly good anticorrosive properties seem to be achieved for zinc-magnesium alloy pigments which feature a particular ratio of zinc to magnesium. It is suspected here that this can be attributed to formation of specific intermetallic phases and/or specific separation. In particular embodiments, it is preferable that the molar ratio of zinc to magnesium is within a range from preferably 0.75:1 to 1.35:1, preferably within a range from 0.85:1 to 1.25:1, more preferably within a range from 0.9:1 to 1.2:1, even more preferably within a range from 0.93:1 to 1.15:1.

In further preferred embodiments of the invention, the aforementioned platelet-shaped zinc-magnesium alloy pigments comprise not more than 3 mol %, preferably not more than 2.3 mol %, more preferably not more than 1.8 mol %, of Al, Ti, Fe, Cu or mixtures thereof, where the molar percentages are based on the total molar amount of the elements Zn, Mg, Mn, Be, Y, Li, Sn, Al, Ti, Fe and Cu. It is especially preferable that the aforementioned molar percentages are based on the total amount of the elements Be, Y, Li, Sn, Al, Ti, Fe and Cu. It is especially preferable here that Ti, Fe and Cu are each present in an amount of not more than 1.2 mol % and Al in an amount of not more than 1.5 mol %, preferably Ti, Fe and Cu each in an amount of not more than 0.9 mol % and Al in an amount of not more than 1.3 mol %, more preferably Ti, Fe and Cu each in an amount of not more than 0.6 mol % and Al in an amount of not more than 0.9 mol %.

In particular, it is preferable that the platelet-shaped zinc-magnesium alloy pigments aluminum in an amount of less than 1.3 mol %, preferably of less than 0.9 mol %, even further preferably of less than 0.6 mol %, based on the total molar amount of the elements Zn, Mg, Mn, Be, Y, Li, Sn, Al, Ti, Fe and Cu. It is especially preferable when aluminum is present only as a trace constituent, or the amount of aluminum is below the detection limit.

In a further preferred embodiment of the invention, the platelet-shaped zinc-magnesium pigments comprise 45.6 to 57.8 mol % of zinc and 42.2 to 54.4 mol % of magnesium, based in each case on the total molar amount of the elements Zn, Mg, Mn, Be, Y, Li, Sn, Al, Ti, Fe and Cu, where the molar percentages add up to 100 mol %, where Zn, Mg, Mn, Be, Y, Li, Sn, Al, Ti, Fe and Cu constitute at least 95% by weight of the zinc-magnesium pigments, based on the total weight thereof.

Preference is further given to platelet-shaped zinc-magnesium pigments comprising 46.7 to 56.8 mol % of zinc, 43.2 to 53.3 mol % of magnesium and 0 to 4.6 mol % of Mn, Li, Be, Y, Sn, Al, Ti, Fe, Cu and mixtures thereof, further preferably 47.4 to 54.3 mol % of zinc, 45.7 to 52.6 mol % of magnesium and 0 to 3.4 mol % of Mn, Li, Be, Y, Sn, Al, Ti, Fe, Cu and mixtures thereof, where the proportion of Mn, Li, Be, Y, Sn and mixtures thereof is less than 0.18 mol %, based in each case on the total molar amount of the elements Zn, Mg, Mn, Be, Y, Li, Sn, Al, Ti, Fe and Cu, where Zn, Mg, Mn, Be, Y, Li, Sn, Al, Ti, Fe and Cu constitute a total of at least 93% by weight of the zinc-magnesium pigments, based on the total weight thereof.

A very suitable zinc-magnesium alloy has been found to be one having a proportion of 50.5 to 51.5 mol % of zinc, 48.5 to 49.5 mol % of magnesium, 0 to 1 mol % of Mn, Li, Be, Y, Sn, Al, Ti, Fe, Cu and mixtures thereof, where the proportion of Mn, Li, Be, Y, Sn and mixtures thereof is preferably less than 0.15 mol %, and where Zn, Mg, Mn, Be, Y, Li, Sn, Al, Ti, Fe and Cu constitute at least 97% by weight of the zinc-magnesium pigments, based on the total weight thereof. Especially preferably, where Zn, Mg, Mn, Be, Y, Li, Sn, Al, Ti, Fe and Cu constitute at least 98% by weight and further constituents other than oxygen at most 1.5% by weight of the zinc-magnesium pigments.

Surprisingly, therefore, the provision of platelet-shaped zinc-magnesium pigments having a median thickness well below 1 µm, preferably of less than 700 nm, is possible. Even the provision of platelet-shaped zinc-magnesium pigments having a content of 40.8 to 67.8 mol % of zinc, 32.3 to 59.2 mol % of magnesium and 0 to 7 mol % of Mn, Li, Be, Y, Sn, Al, Ti, Fe, Cu and mixtures thereof comprise, where the proportion of Mn, Li, Be, Y, Sn and mixtures thereof is, for example, less than 0.15 mol %, based in each case on the total molar amount of the elements Zn, Mg, Mn, Be, Y, Li, Sn, Al, Ti, Fe and Cu, where the molar percentages to 100 mol %, is surprising in view of the low ductility or high brittleness of this alloy. However, it was entirely unexpected in accordance with the invention that it is possible to provide not just platelet-shaped zinc-magnesium pigments but platelet-shaped zinc-magnesium pigments having extremely low thicknesses.

In addition, it was found that it is possible by means of inventive use of a rapid and high energy input to achieve homogeneous grinding with distinctly reduced fracture of the larger particles. This can especially be achieved through the use of a stirred ball mill. In contrast, in a normal ball mill, it seems that the significantly lower and slower energy input that is usually standard here breaks up larger particles to a greater than average degree, such that the $D_{90}$ value falls to a disproportionately high degree in the attempt to produce platelet-shaped zinc-magnesium pigments having a median thickness of less than 1 µm. Especially in the case of production of platelet-shaped zinc magnesium pigments having a median thickness below 500 nm, the proportion of large particles decreases to a disproportionately high degree, and so the span Ad according to formula (I) span $\Delta D=(D_{90}-D_{10})/D_{50}$ is very small. This continues in the course of further grinding. By means of the inventive grinding using a rapid and high energy input, for example using a stirred ball mill, in contrast, it was surprisingly also possible to achieve median thicknesses below 500 nm, while large particles are conserved, which in turn results in a higher $D_{90}$. Such a proportion of larger particles appears to be advantageous in turn, for example, for the contacting of the individual particles or the formation of a continuous barrier layer, which enhances the cathodic oxidation protection of the compositions in question.

The term "stirred ball mill" in the context of the present invention is understood to mean that the mill has a rotor within, which sets the grinding bodies, preferably balls, in motion or contributes to the movement thereof. A specific form of the stirred ball mill has a rotor within, while the outer wall rotates at the same time.

It is a characteristic feature of the inventive zinc-magnesium pigments that they have a median thickness of less than 1 preferably less than 700 nm, more preferably less than 550 nm, more preferably less than 400 nm and even more preferably less than 350 mm.

In addition, it is preferable in accordance with the invention to provide platelet-shaped zinc-magnesium pigments having a median thickness from a range from 90 nm to less than 1000 nm. In a further preferred embodiment, the median thickness of the zinc-magnesium pigments is within a range from 100 nm to less than 700 nm, even further preferably from 110 nm to less than 550 nm. Another very suitable thickness has been found to be one from a range from 120 nm to less than 400 nm. Exceptionally preferably, the median thickness is within a range from 125 nm to less than 350 nm.

The median thickness of the zinc-magnesium pigments can be determined from a thickness distribution found via thickness counting by scanning electron microscopy (SEM), viewed as a cumulative frequency distribution. In this method, by means of scanning electron microscopy (SEM), a number of particles sufficient that a representative statistical evaluation can be undertaken are analyzed. Typically about 100 particles, preferably 100 particles, are analyzed.

The thickness distribution is appropriately illustrated in the form of a cumulative frequency distribution curve. The median value is given by the $h_{50}$ value of the cumulative frequency distribution. A measure of the proportion of the thicker pigments is the $h_{90}$ value. This value means that 90% of all the pigment particles have a thickness equal to and/or below this value. Analogously, the $h_{10}$ value is a measure of the proportion of the thinner pigments in the thickness distribution, which means that 10% of all the pigment particles have a thickness equal to and/or below this value. The $h_{50}$ value consequently gives the median thickness value, meaning that 50% of all the pigment particles have a thickness equal to and/or below this value.

The measurement of thickness of the individual pigments by means of SEM and the calculation of the median thickness are effected by the method described in DE 10 315 775 A1.

In summary, the thickness of the zinc-magnesium pigments can be determined by means of SEM as follows:

The inventive platelet-shaped zinc-magnesium pigments are first washed with acetone and then dried.

A resin customary in electron microscopy, for example TEMPFIX (Gerhard Neubauer Chemikalien, D-48031 Münster, Germany), is applied to a sample stage and is heated on a hotplate until it softens. Subsequently, the sample stage is removed from the hotplate and the zinc-magnesium pigments are scattered onto the softened resin. The resin solidifies again as a result of the cooling, and the zinc-magnesium pigments scattered on—as a result of the interplay between adhesion and gravity—can be prepared in virtually upright and fixed form on the sample stage. As a result, the pigments have good lateral analyzability in an electron microscope. In the analysis of the thickness, the azimuthal angle α of the pigment is estimated relative to a plane normal to the surface, and is taken into account in the thickness evaluation by the formula $h_{eff}=h_{meas}/\cos \alpha.$ The cumulative distribution curve is drawn with the $h_{eff}$ values using the relative frequencies. About 100 pigments, preferably 100 pigments, are counted.

Alternatively, the thicknesses of the pigments can also be counted using transverse sections of painted samples. However, this method should be employed only in the case of very good plane-parallel orientation of the pigments. Otherwise, the pigments in the tranverse section may be oriented with an azimuthal angle of inclination, but one which is not apparent to the observer. This leads to a systematic measurement of higher thicknesses.

The provision of platelet-shaped zinc-magnesium pigments having the above-specified low median thicknesses allows the provision of an anticorrosion coating in which the total thickness can be significantly reduced because of the inventive platelet-shaped zinc-magnesium pigments having the median thicknesses specified. This enables the use of the inventive pigments especially in anticorrosion applications with very thin coatings, for example aircraft coatings or coil coating.

Because of the low thickness of the inventive platelet-shaped zinc-magnesium pigments, the hiding capacity of the inventive platelet-shaped zinc-magnesium pigments, i.e. the coverage of the area per unit weight of pigment, is very high. Given the same weight, for example 1 g of pigment, thinner platelet-shaped zinc-magnesium pigments have a higher hiding capacity than platelet-shaped zinc-magnesium pigments having a greater thickness, since the number of platelet-shaped pigments per unit weight is higher in the case of thinner platelet-shaped zinc-magnesium pigments than in the case of thicker platelet-shaped zinc-magnesium pigments. The thinner platelet-shaped zinc-magnesium pigments, in the article to be protected from corrosion, for example an aircraft fuselage or a vehicle body, can be arranged alongside one another and one on top of another such that, firstly, extremely effective barrier protection is built up and, secondly, the article to be protected from corrosion is reliably covered by the platelet-shaped zinc-magnesium pigments having low thickness.

In a further preferred embodiment of the invention, the platelet-shaped zinc-magnesium pigments have a median diameter $D_{50}$ from a range from 4 to 35 µm, further preferably from 4.5 to 30 µm, even further preferably from 5 to 25 µm. Another very suitable median diameter has been found to be one from 5 to 18 µm.

In a further preferred embodiment, the platelet-shaped zinc-magnesium pigments have a size distribution having a span Δd according to formula (II) span $\Delta D = (D_{90} - D_{10})/D_{50}$ of 1 to 2.3. Further preferably, the span is 1.2 to 1.9, even further preferably 1.3 to 1.5.

The span ΔD is a characterization of the breadth of the particle size distribution. The smaller the span, the narrower the particle size distribution.

The $D_{10}$, $D_{50}$ and $D_{90}$ values of the cumulative frequency distribution of the inventive zinc-magnesium pigments, as obtained by laser diffraction methods, indicate that, respectively, 10%, 50% and 90% of the zinc-magnesium pigments have a diameter equal to or less than the value specified in each case. The size distribution curve can be determined with a Malvern instrument (instrument: Malvern Mastersizer 2000) according to the manufacturer's instructions. The scattered light signals are evaluated by the Mie theory.

In a preferred development of the invention, the $D_{10}$ value is within a range from 0.9 µm to 6 µm, preferably from 1.0 to 3.3 µm, further preferably from 1.5 µm to 5.8 µm, even further preferably from 1.8 µm to 4.5 µm.

It is additionally preferable that the $D_{50}$ value is within a range from 3 µm to 25 µm, further preferably from 4.0 µm to 20 µm, even further preferably from 4.5 µm to 14 µm.

It is additionally preferable that the $D_{90}$ value is within a range from 5 µm to 56.7, further preferably from 6 µm to 46.8 µm, even further preferably from 7 to 39.5 µm.

In a further preferred embodiment of the invention, the platelet-shaped zinc-magnesium pigments have only such combinations of $D_{10}$, $D_{50}$ and $D_{90}$ values that the span ΔD is within the above-specified ranges.

The $D_{10}$ value is a measure of the fines fraction in a particle size distribution. The greater the $D_{10}$ value, the smaller the fines fraction. Particles having a size or a diameter of less than 1 µm cannot be in platelet form, and instead are in spherical or irregular form.

The inventive platelet-shaped zinc-magnesium pigments, regardless of the brittleness of the zinc-magnesium alloy for use in accordance with the invention, have an extremely low proportion of non-platelet-shaped particles, for example in the form of abraded material or irregularly shaped fragments.

Because of the extremely low proportion of spherical and/or irregularly shaped particles in the platelet-shaped zinc-magnesium pigments, the platelet shape of the zinc-magnesium pigments results firstly in an improvement in barrier action and secondly in improved sacrificial anode action.

Preferably, the aspect ratio, i.e. the ratio of median pigment diameter ($D_{50}$) to median pigment thickness ($h_{50}$), is at least 6. It is especially preferable that the aspect ratio is within a range from 10 to 200, further preferably from 12 to 100, further preferably from 15 to 75, even further preferably from 18 to 50, even further preferably from 20 to 40.

Particularly preferred platelet-shaped zinc-magnesium pigments have a median thickness of less than 700 nm, and a composition of 48.9 to 54.1 mol % of zinc, 45.9 to 51.1 mol % of magnesium and 0 to 2.7 mol % of Mn, Li, Be, Y, Sn, Al, Ti, Fe, Cu and mixtures thereof comprise, based in each case on the total molar amount of the elements Zn, Mg, Mn, Be, Y, Li, Sn, Al, Ti, Fe and Cu, where the molar percentages add up to 100 mol %, where Zn, Mg, Mn, Be, Y, Li, Sn, Al, Ti, Fe and Cu constitute at least 95% by weight of the zinc-magnesium pigments, based on the total weight thereof. Very particularly preferred platelet-shaped zinc-magnesium pigments have a median thickness of 100 to 700 nm, and a composition of 50.1 to 52.7 mol % of zinc, 47.3 to 49.9 mol % of magnesium and 0 to 2.3 mol % of Mn, Li, Be, Y, Sn, Al, Ti, Fe, Cu and mixtures thereof comprise, based in each case on the total molar amount of the elements Zn, Mg, Mn, Be, Y, Li, Sn, Al, Ti, Fe and Cu, where the molar percentages add up to 100 mol %, where Zn, Mg, Mn, Be, Y, Li, Sn, Al, Ti, Fe and Cu constitute at least 95% by weight of the zinc-magnesium pigments, based on the total weight thereof. It is especially preferred here that the proportion of Mn, Li, Be, Y, Sn and mixtures thereof, in the aforementioned embodiments, is less than 0.15 mol %, based on the total molar amount of the elements Zn, Mg, Mn, Be, Y, Li, Sn, Al, Ti, Fe and Cu.

The alloy is produced by melting the zinc and magnesium components and any further constituents into the form of a homogeneous melt under inert gas, preferably argon. The melt is then atomized in a conventional manner under inert gas, preferably under argon, to obtain a zinc-magnesium alloy powder. The powder is preferably in spherical form. Inclusions of elemental metal or intermetallic phases may form in the resultant alloy powder. Using the process according to the invention, the zinc-magnesium powder thus obtained can be used to produce the platelet-shaped zinc magnesium pigments.

In a further preferred embodiment, the platelet-shaped zinc-magnesium pigments have been obtained by mechanical forming using a stirred ball mill.

In principle, it is possible to produce platelet-shaped zinc-magnesium pigments via physical vapor deposition. The defined vaporization of zinc metal and magnesium metal to obtain a specified zinc-magnesium alloy is technically complex and associated with very high costs. However, zinc-magnesium pigments are a material used in large volumes, which has to be producible inexpensively.

In this respect, the production of the platelet-shaped zinc-magnesium pigments via physical vapor deposition is a possible route, but not one which enables a marketable product because of its costs.

Therefore, it is preferable to produce the inventive platelet-shaped zinc-magnesium pigments by mechanical forming, especially using a stirred ball mill. The platelet-shaped zinc-magnesium pigments produced by mechanical forming using a stirred ball mill differ structurally from the platelet-shaped zinc-magnesium pigments produced by physical vapor deposition by the nature of the surface. By means of physical vapor deposition, pigments having an absolutely planar surface are obtained. In addition, the metallic pigments produced via physical vapor deposition have straight fracture edges after detachment from carrier material.

The inventive platelet-shaped zinc-magnesium pigments produced by mechanical forming using a stirred ball mill are notable firstly for a surface that is not absolutely planar, but instead for a surface which is slightly corrugated. In addition, the platelet-shaped zinc-magnesium pigments produced by mechanical forming have rounded edge regions having slight edge cracks. In structural terms, therefore, platelet-shaped zinc-magnesium pigments produced by physical vapor deposition can be differentiated easily from platelet-shaped zinc-magnesium pigments obtained by mechanical forming, for example by means of scanning electron microscopy (SEM).

By means of the process according to the invention, it is possible to produce platelet-shaped zinc-magnesium pigments inexpensively by mechanical forming. In corrosion protection, the optical properties of the pigments are not particularly important. Instead, the platelet-shaped structure of the pigments is essential for effective corrosion protection. The fact that the platelet-shaped zinc-magnesium pigments produced by mechanical forming have a much less homogeneous surface is not disadvantageous for effective corrosion protection.

The present invention further provides an anticorrosion coating comprising the inventive platelet-shaped zinc-magnesium pigments.

The inventive zinc-magnesium pigments can be incorporated into a wide variety of different coating compositions, for example paints and coatings.

The proportion of the zinc-magnesium pigments can be adjusted according to the respective profile of requirements in the anticorrosion coating. Typically, the proportion of the zinc-magnesium pigments in the anticorrosion coating is preferably within a range from 10% to 80% by weight, further preferably from 15% to 70% by weight, even further preferably from 20% to 65% by weight, based on the total weight of the anticorrosion coating.

The proportion of binder in the anticorrosion coating is preferably within a range from 15% to 85% by weight, further preferably from 25% to 75% by weight, even further preferably from 35% to 70% by weight, based on the total weight of the anticorrosion coating.

In the case of a coating or paint, the proportion of solvent in the anticorrosion coating is preferably within a range from 1% to 10% by weight, further preferably from 2% to 8% by weight, even further preferably from 2% by weight to 5% by weight. Water may also be present in the organic solvent. Preferably, the water content, based on the total weight of the solvent, is less than 1% by weight, further preferably less than 0.9% by weight, even further preferably than 0.8% by weight.

The above-specified composition of the anticorrosion coating is the composition to be applied, and therefore not the dried composition.

Solvents used may be the organic solvents typically used in paints and coatings, for example ethoxypropyl acetate, methyl ethyl ketone, methyl isobutyl ketone, ethyl acetate, butyl acetate, xylene, acetone and mixtures thereof.

The inventive anticorrosion coating may take the form of a one-pack system (1K) or of a two-pack system (2K).

The anticorrosion coating may also take the form of an anodic or cathodic dipcoat.

In a further development of the invention, the inventive anticorrosion coating takes the form of a powder coat.

The inventive platelet-shaped zinc-magnesium pigments are extremely versatile in terms of use, and can therefore be incorporated into a wide variety of different coating compositions.

Binders used in conjunction with the inventive platelet-shaped zinc-magnesium pigments may be all the customary paint binders and coating binders. The binders used in each case are selected as a function of the solvent and/or the respective coating method.

In the case of powder coatings, preference is given to using thermoplastic or thermoset resins as binders.

For example, thermoplastic binders used may be polyvinyl chloride, polyamides, polyethylenes, polypropylenes, polyvinylidene fluorides and other thermoplastic resins.

Thermoset or heat-curable binders used may, for example, be epoxy resins, polyurethane resins, polyester resins, acrylate resins, etc.

Epoxy resins and polyurethane resins have been found to be very suitable, for example for use in powder coatings. In addition, epoxy resins on the one hand and polyurethane resins on the other hand are used especially as binder systems for the exterior finishing of aircraft. For example, it is possible to use the binder systems sold by Sherwin-Williams, USA, or binder systems sold by DuPont, USA.

The inventive anticorrosion coatings may comprise the customary additives, for example wetting agents or dispersants, surface additives, matting agents, rheology additives, light stabilizers, for example UV stabilizers, desiccants, biocides or mixtures thereof.

The inventive platelet-shaped zinc-magnesium pigments should in principle be applied to all customary substrates as anticorrosion paint. Preferably, however, they are applied to specific substrates, especially comprising base metals such as aluminum alloys. Examples of corresponding aluminum alloys are AA2024, AA5754. Since the standard potential of aluminum is lower than that of zinc, zinc platelets (or zinc dust) cannot be used here.

The inventive platelet-shaped zinc-magnesium pigments, in a preferred embodiment of the invention, are suitable for use in belt coating, also called coil coating, of, for example, aluminum coils, aluminum alloy coils or steel coils, or aluminum sheets, aluminum alloy sheets or steel sheets.

The sheets coated by means of coil coating find various uses, for example in facades, roofing elements or domestic appliances, for example refrigerators, washing machines, dishwashers, etc.

Because of the extremely low median thickness of the inventive zinc-magnesium pigments of less than 1 µm, preferably of less than 700 nm, as stated above, it is possible to apply a highly effective anticorrosion coating having a total dry thickness of preferably 10 to 200 µm, preferably of 25 to 150 µm, further preferably of 30 to 100 µm. A very suitable total dry thickness has been found to be one from 10 to 40 µm.

It has been found that, surprisingly, anticorrosion coatings, preferably based on epoxy resin or based on polyurethane resin, comprising the inventive platelet-shaped zinc-magnesium pigments, preferably in a median thickness of about 80 nm to 450 nm, further preferably of about 100 nm to 400 nm, even further preferably of 130 nm to 350 nm, are particularly suitable for the coating of aircraft.

Anticorrosion coatings in aircraft are exposed to extreme conditions. For example, these anticorrosion coatings have to withstand temperature changes from +70° C. to 60° C. within a few minutes. It is also necessary that the aircraft paints are resistant to the intense UV radiation which occurs at cruising altitude. Finally, aircraft paints also have to be resistant to chemical and mechanical stresses, for example to kerosene and hydraulic fluid, grains of sand, ice crystals and vibrating wings.

The inventive platelet-shaped zinc-magnesium pigments are especially suitable for use as zinc-magnesium pigments in paints for finishing of aircraft.

In order to keep the total weight of an aircraft low with respect to the requisite stability, aluminum alloys are used in aircraft construction. One aluminum alloy employed is the aluminum alloy referred to as AA2024. The aluminum alloy AA2024 has a density of 2.78 g/cm$^3$ and contains, in aluminum, about 4.3% to 4.4% by weight of copper, 0.5% to 0.6% by weight of manganese, 1.3% to 1.5% by weight of magnesium and less than about 0.5% by weight of zinc, nickel, chromium, lead and bismuth. Typically, the composition of the aluminum alloy AA2024 is reported as AlCu4Mg1. This aluminum alloy has the mechanical properties required for aircraft construction, but poor corrosion resistance.

A further aluminum alloy, AA5754, which is also employed in automobile construction and shipbuilding, has a density of about 2.66 g/cm$^3$ and contains, in aluminum, 2.6% to 3.6% by weight of magnesium, 0.5% by weight of manganese, 0.4% by weight of iron, 0.4% by weight of Si, 0.3% by weight of Cr, 0.2% by weight of Zn, 0.15% by weight of Ti and 0.1% by weight of Cu. Typically, the composition of the aluminum alloy AA5754 is reported as AlMg3.

The standard electrochemical potential of zinc is −0.76 V, whereas the standard electrochemical potential of aluminum is −1.66 V. Therefore, zinc is more noble than aluminum, which is why aluminum would be dissolved in the event of direct contact of zinc and aluminum under moist conditions, for example.

The standard electrochemical potential in the case of the inventive platelet-shaped zinc-magnesium alloy pigments is formed essentially by zinc and magnesium, which are the two main constituents of the alloys used in accordance with the invention.

The standard electrochemical potential of manganese, for example, is −1.18 V, that of beryllium −1.85 V, that of yttrium −2.37 V, that of lithium −3.04 V and that of tin −0.14 V.

Since these metals, however, are present in a maximum proportion of 7 mol % in the alloy to be used, their influence on the standard electrochemical potential is low.

Through the increase in the proportion of magnesium in the zinc alloy used in accordance with the invention, it is possible to lower the standard electrochemical potential, such that there is effective corrosion protection, especially with respect to the aluminum alloys used in aircraft construction.

By virtue of the platelet-shaped structure of the inventive zinc-magnesium pigments, they can firstly serve in a physically effective manner as a barrier, and secondly can serve effectively as a sacrificial anode, as a result of the two-dimensional contact with the article to be protected from corrosion, for example an aircraft fuselage or ship's hull or a chassis.

Because of the extremely low pigment thickness of the inventive platelet-shaped zinc-magnesium pigments, the inventive platelet-shaped zinc-magnesium pigments can be used in extremely thin coatings, as required in aircraft coatings, for example, with layer thicknesses of about 30 μm or less.

Since the inventive platelet-shaped zinc-magnesium pigments preferably have a layer thickness of less than 500 nm, the inventive platelet-shaped zinc-magnesium pigments may be stacked alongside one another and especially repeatedly one on top of another in the anticorrosion coating, so as to form an extremely effective physical barrier. Given a paint layer thickness of 30 μm, it is therefore possible, given a median pigment thickness of less than 500 nm, for an average of up to 60 layers of inventive platelet-shaped zinc-magnesium pigments to be arranged one on top of another, which brings about extremely effective corrosion protection.

The inventive platelet-shaped zinc-magnesium pigments can of course be employed not just in aircraft paint systems, but also in paint systems for ships or boats and also in vehicle bodies. Vehicle bodies are understood to mean motor vehicle bodies in automobiles, in trucks, and also in motorbikes or scooters.

It is likewise possible to use the inventive platelet-shaped zinc-magnesium pigments in corrosion protection of buildings, facades, door and window frames, bridges, wind turbines, power masts, etc.

As a result, the object underlying the invention is also achieved by an article coated with the inventive platelet-shaped zinc-magnesium pigments or the inventive anticorrosion coating. The inventive article is selected from the group consisting of aircraft, ships, boats, vehicle bodies, cans, wall claddings made of metal, especially of aluminum, bicycles, buildings, facades, door and window frames, power masts, wind turbines and bridges.

Particular preference is given to articles made from aluminum or aluminum alloy or articles which have been endowed with aluminum or an aluminum alloy. Therefore, the article is preferably aircraft, ships, boats or vehicle bodies, especially preferably aircraft.

The object underlying the invention is also achieved by a process for producing the inventive platelet-shaped zinc-magnesium pigments. This process has the following step:

mechanical forming of non-platelet-shaped zinc-magnesium particles having a content of 40.8 to 67.8 mol % of zinc, 32.2 to 59.2 mol % of magnesium and 0 to 7 mol % of Mn, Li, Be, Y, Sn, Al, Ti, Fe, Cu and mixtures thereof comprise, based in each case on the total molar amount of the elements Zn, Mg, Mn, Be, Y, Li, Sn, Al, Ti, Fe and Cu, where the molar percentages add up to 100 mol %, where at least 2500 kJ per kg of platelet-shaped zinc-magnesium particles are introduced into the unit at a rate of at least 600 kJ per kg of platelet-shaped zinc-magnesium particles per hour, using grinding bodies, into a platelet shape.

As already explained above, the alloys used for production of the inventive platelet-shaped zinc-magnesium pigments having a proportion of 40.8 to 67.8 mol % of zinc, 32.2 to 59.2 mol % of magnesium and 0 to 7 mol % of Mn, Li, Be, Y, Sn, Al, Ti, Fe, Cu and mixtures thereof comprise, where the proportion of Mn, Li, Be, Y, Sn and mixtures thereof is, for example, less than 0.15 mol %, based in each case on the total molar amount of the elements Zn, Mg, Mn, Be, Y, Li, Sn, Al, Ti, Fe and Cu, where the molar percentages add up to 100 mol %, have low ductility and high brittleness.

In the process according to the invention, non-platelet-shaped metal particles preferably having an approximately spherical geometry are used. The non-platelet-shaped metal particles of the zinc-magnesium alloy used in accordance with the invention, which preferably have an approximately spherical geometry, are obtained by atomizing a metal alloy melt comprising a composition of 40.8 to 67.8 mol % of zinc, 32.2 to 59.2 mol % of magnesium and 0 to 7 mol % of Mn, Li, Be, Y, Sn, Al, Ti, Fe, Cu and mixtures thereof, where the proportion of Mn, Li, Be, Y, Sn and mixtures thereof is preferably less than 0.18 mol %, more preferably less than 0.15 mol %, based in each case on the total molar amount of the elements Zn, Mg, Mn, Be, Y, Li, Sn, Al, Ti, Fe and Cu, where the molar percentages add up to 100 mol %, in a conventional manner by atomization. The metal particles obtained after the atomization of the melt are generally spherical and have a median particle diameter within a range from 2 μm to 100 μm, further preferably from 5 μm to 80 μm, even further preferably from 10 μm to 40 μm.

Preferably, the metal powder obtained by atomization has a narrow particle size distribution. It is preferable that the spherical metal particles of the alloy for use in accordance with the invention have a $D_{10}$ value of 0.9 μm to 6 μm, preferably of 1.0 to 3.3 μm, a $D_{50}$ value of 3 μm to 25 pm, preferably of 4 μm to 14 μm, and a $D_{90}$ value of 5 μm to 39.5 μm, preferably of 6 μm to 25 μm.

The inventors have found that, surprisingly, platelet-shaped deformation of the non-platelet-shaped zinc-magnesium particles can be achieved when a large amount of energy is introduced within a short time. In addition, it was found to be advantageous when this energy is transmitted not predominantly in the form of impact energy in particular, but very substantially in the form of friction energy, as especially effected using a stirred ball mill. In the case of use of a conventional ball mill, the energy is transmitted predominantly in the form of impact energy when two grinding bodies, preferably grinding balls, hit one another and plastically deform metal particles present between the grinding bodies. In the case of friction energy, the energy is brought about by rolling of two grinding bodies, preferably grinding balls, against one another, with the non-platelet-shaped metal particles disposed between the grinding balls. Alternatively, rolling of the grinding bodies, preferably grinding balls, can also be effected between the wall of the mill and the grinding body. Especially preferably in the context of the present invention, the grinding unit used is therefore a stirred ball mill.

A stirred ball mill works by the rotor-stator principle and differs significantly from the form of mill that is normally understood by the term "ball mill", even though the terminology suggests that it is a special form of the ball mill.

Stirred ball mills consist of a vertical or horizontal, usually cylindrical vessel filled to an extent of 50% to 90% by volume, preferably 70% to 90% by volume, with grinding bodies, usually consisting of steel, glass or wear-resistant ceramic materials. This vessel is the stator. The rotor is a stirrer system having suitable stirrer elements (rods or disks) or a smooth-wall stirrer body. The stirrer body is driven and ensures intensive movement of the grinding bodies. The millbase suspension, i.e. the non-platelet-shaped ZnMg alloy particles, is passed continuously through the grinding space. In the course of this, the suspended ZnMg alloy particles are formed and dispersed between the grinding bodies by impact forces and particularly shear forces. At the mill outlet, millbase and grinding bodies are separated by means of a suitable separating system, for example a screen.

The effect of the stirred ball mill, compared to a ball mill filled with grinding bodies to an extent of about 30% to 40% by volume, is gentler plastic deformation of the ZnMg particles, predominantly through shear forces.

In order to bring about gradual deformation of the non-platelet-shaped metal particles to give the inventive platelet-shaped zinc-magnesium pigments without causing any significant abrasion or comminution of the non-platelet-shaped metal particles, the process parameters are preferably adjusted such that the energy input is at least 2500 kJ per kg of platelet-shaped zinc-magnesium particles at a rate of at least 600 kJ per kg of platelet-shaped zinc-magnesium particles per hour.

It is especially preferable in the aforementioned embodiments that at least 3300 kJ per kg of platelet-shaped zinc-magnesium particles (kJ/kg) are introduced at a rate of at least 680 kJ per kg of platelet-shaped zinc-magnesium particles per hour (kJ/kg·h), more preferably at least 3700 kJ/kg at a rate of at least 730 kJ/kg·h, even more preferably at least 4250 kJ/kg at a rate of at least 800 kJ/kg·h and even more at least 4700 kJ/kg at a rate of at least 835 kJ/kg·h.

The mechanical forming may be followed by process steps such as the removal of the platelet-shaped zinc-magnesium pigments. In addition, there may optionally follow a classification step in which a desired particle size distribution of the platelet-shaped zinc-magnesium pigments is established.

The classification, for example for removal of any fines fraction present, for example abraded material, or for establishment of a desired span ΔD, can be conducted, for example, by means of a cyclone, screens, etc.

The invention is illustrated in detail hereinafter with reference to the appended figures and examples, without being restricted thereto.

FIGURES

Figure 2:
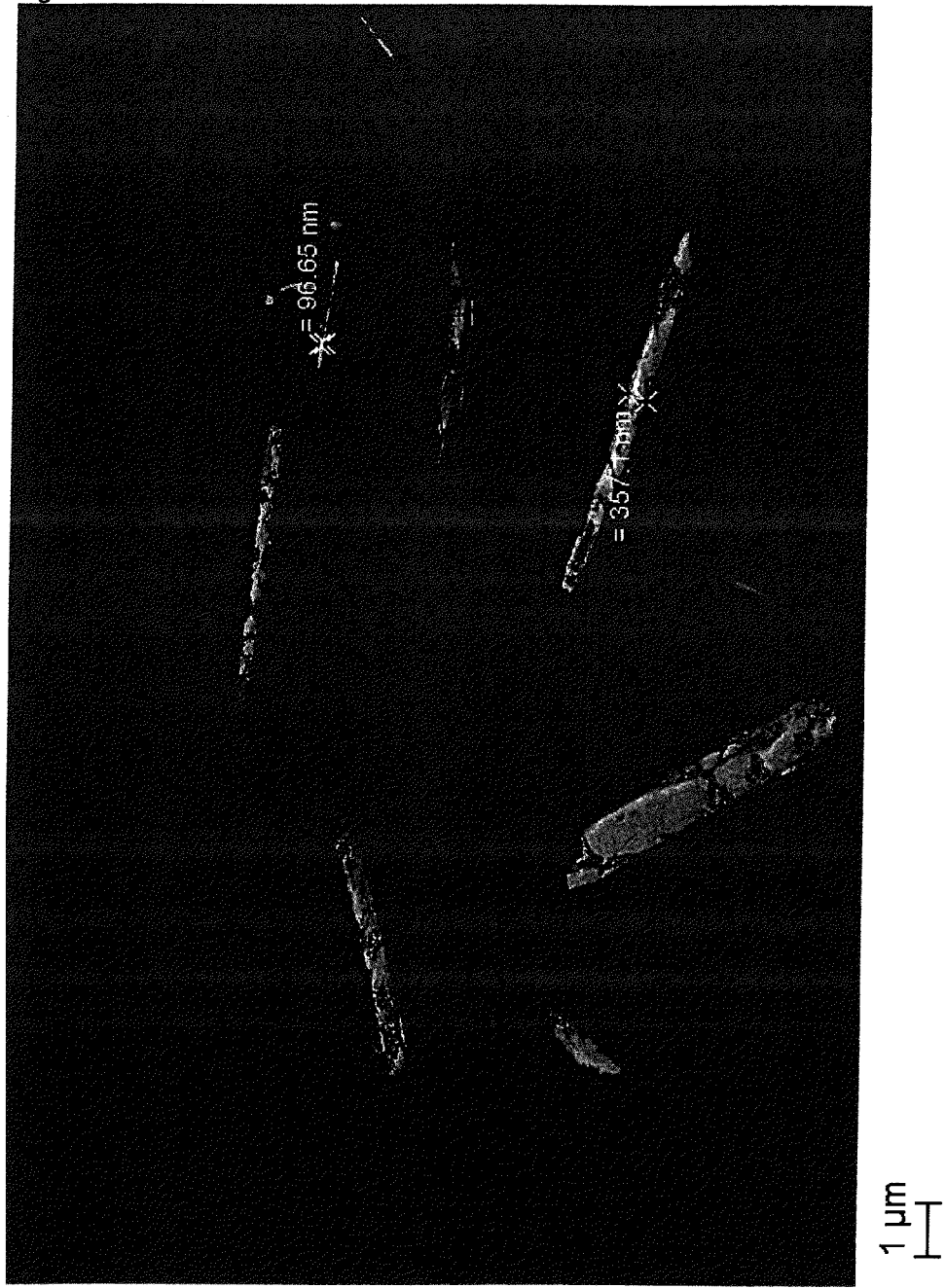
FIG. 2 represents a scanning electron micrograph of platelet-shaped pigments according to Example 2.

FIGS. 1 and 2 show a scanning electron micrograph of platelet-shaped pigments according to example 2.

Figure 3:
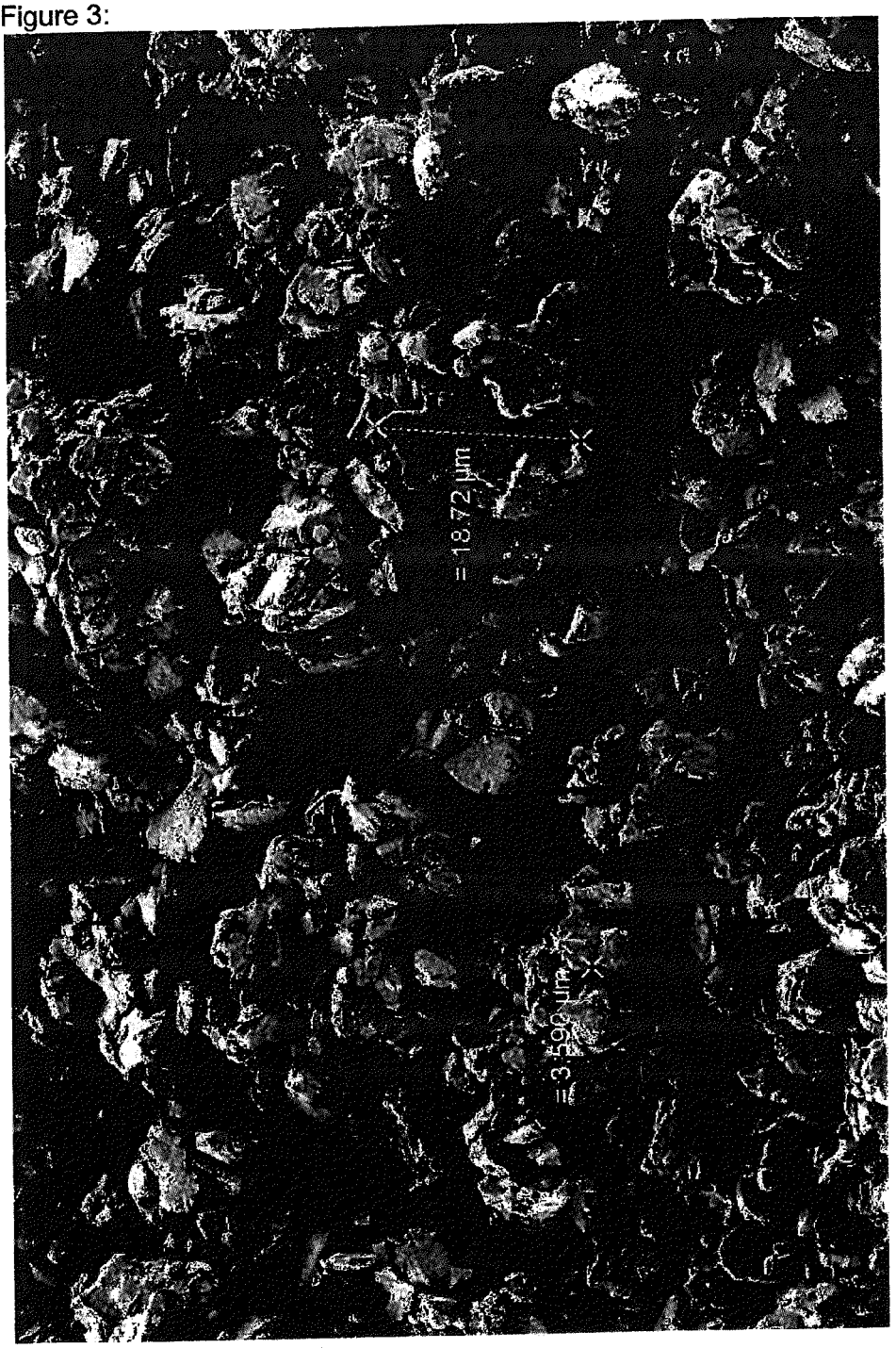
FIG. 3 illustrates a scanning electron micrograph of platelet-shaped pigments according to Comparative Example 3.
Figure 4:
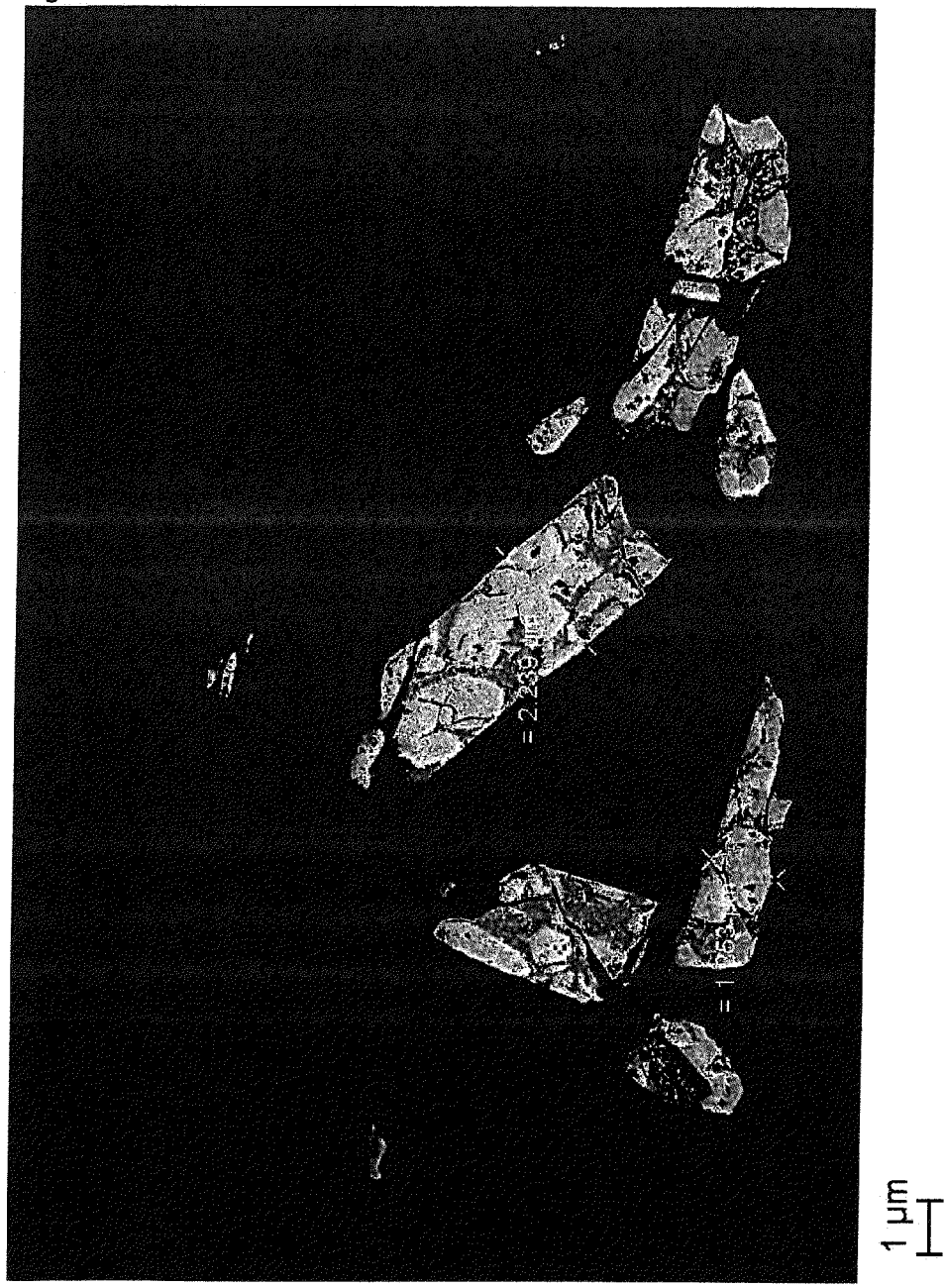
FIG. 4 exemplifies a scanning electron micrograph of platelet-shaped pigments according to Comparative Example 3.

FIGS. 3 and 4 show a scanning electron micrograph of platelet-shaped pigments according to comparative example 3.

EXAMPLES

Example 1

Production of Zinc-magnesium Particles (51.4 mol % of Zinc, 48.6 mol % of Magnesium)

296 kg of zinc and 104 kg of magnesium were melted at a temperature of >650° C. in an argon-inertized melting crucible. The melt was then atomized through a nozzle into a spray bunker, to obtain a powder having a particle size distribution having a $D_{10}$ of 7.2 μm, a $D_{50}$ of 17.3 μm and a $D_{90}$ of 35.3 μm.

Example 2

Production of Inventive Zinc-magnesium Pigments 9 kg of the zinc-magnesium powder produced according to example 1 were ground in 32 liters of isopropanol (solvent) in a Netzsch RWK LMZ10 stirred ball mill at a specific energy input based on material $E_m(t)$ of 4252.5 kJ/kg. Thereafter, the grinding balls and the solvent were separated from the pigments obtained. The particle size distribution was determined in a Malvern Mastersizer 2000 according to the manufacturer's instructions ($D_{10}$: 3.0 μm, $D_{50}$: 6.9 μm, $D_{90}$: 13.3 μm), and the median pigment thickness ($h_{50}$=300 nm) by means of SEM as described above and in DE 103 15 775 A1 (paragraphs [0125] to [0127]).

It is apparent from FIGS. 1 and 2 that the resultant pigments are platelet-shaped and contained virtually no fragments or abraded material. In addition, the resultant particles had a very low median pigment thickness. They are therefore of particularly good suitability, for example, for processing a a very thin, highly effective corrosion coating.

Comparative Example 3

Grinding of Zinc-magnesium Particles Under Standard Conditions 9 kg of the zinc-magnesium powder produced according to example 1 were ground in 32 liters of petroleum spirit (solvent) in a ball mill (dimensions: length: 100 cm, diameter: 100 cm) and steel grinding balls (diameter 12 mm) with a speed of rotation of 40 revolutions per minute for 10 hours. Thereafter, the grinding balls and the solvent were separated from the pigments obtained. The particle size distribution was determined in a Malvern Mastersizer 2000 according to the manufacturer's instructions ($D_{10}$: 2.6 µm, $D_{50}$: 5.0 µm, $D_{90}$: 9.2 µm), and the median pigment thickness ($h_{50}$=2 µm) by means of SEM as described above and in DE 103 15 775 A1 (paragraphs [0125] to [0127]).

It is apparent from FIGS. 3 and 4 that the resultant particles are fragments and abraded material. In addition, the resultant particles have an excessively high median pigment thickness of 2 µm. A longer grinding time did not lead to platelet-shaped pigments having a lower median pigment thickness, but merely led to further comminution of the particles.

Example 4

Production of Further Zinc-magnesium Pigments

Analogously to example 2 or comparative example 3, under slightly altered conditions, and optionally the use of other powders (e.g. $D_{10}$=3.8 µm, $D_{50}$=8.4 µm and $D_{90}$=15.6 µm), further zinc-magnesium pigments were produced. In this way, for example, the following zinc-magnesium pigments were obtained:

| | $D_{10}$ | $D_{50}$ | $D_{90}$ | $h_{50}$ |
|---|---|---|---|---|
| Example 4-1 | 1.7 | 4.3 | 8.9 | 300 nm |
| Comparative example 4-2 | 5.0 | 12.7 | 22.3 | 2000 nm |
| Example 4-3 | 2.6 | 5.0 | 9.2 | 900 nm |
| Comparative example 4-4 | 4.1 | 10.1 | 20.0 | 1100 nm |

Use Example 1

The corresponding pigments were incorporated into a test paint system comprising a basecoat and a curing agent.

The test paint system has the following composition:

| Basecoat | |
|---|---|
| ethyl 3-ethoxypropionate | 4.6 g |
| methyl amyl ketone | 4.0 g |
| Cymel UI-38-I (Cytec Surface Specialties) | 0.8 g |
| DEN 431 (DOW Chemical) | 30 g |
| Bentone 38 10% (Elementis Specialties) in 85% xylene and 5% ethanol | 20 g |
| MIN-U-Sil 10 (US Silica) | 6 g |
| barium sulfate | 30 g |
| methyl ethyl ketone | 5.5 g |
| BYK-361-N (BYK-Chemie GmbH) | 1.2 g |
| Z-6040 silane (Dow Corning) | 1.7 g |
| Pigment paste (solids content 91%) | 75 g |

| Curing agent | |
|---|---|
| xylene | 7.2 |
| n-butanol | 2.9 |
| Aradur 283 (Huntsman) | 23.0 |
| EH 637 Beckopox (Cytec Surface Specialties) | 5.7 |
| Ancamine K54 (Air Products) | 2.6 |
| Z-6121 Silan (Dow Corning) | 0.8 |

Subsequently, the coated sheets were subjected to the Filiform test to DIN EN 3665 and the salt spray test to ISO 9227. In this way, the following results were obtained:

| | Filiform test (ISO 4623-2) | Salt spray test (ISO 9227) |
|---|---|---|
| Example 4-1 | passed | passed |
| Comparative example 4-2 | criteria far exceeded | criteria far exceeded |
| Example 4-3 | criteria slightly exceeded | passed |
| Comparative example 4-4 | criteria far exceeded | criteria slightly exceeded |

The invention claimed is:

1. A platelet-shaped zinc-magnesium pigment, comprising 40.8 to 67.8 mol % of zinc, 32.2 to 59.2 mol % of magnesium and 0 to 7 mol % of at least one metal selected from the group consisting of Mn, Li, Be, Y, Sn, Al, Ti, Fe, Cu and mixtures thereof, based upon the total molar amount of Zn, Mg, Mn, Be, Y, Li, Sn, Al, Ti, Fe and Cu, wherein the molar percentages add up to 100 mol %, and the median thickness $h_{50}$ of the pigments is less than 1 µm.

2. The platelet-shaped zinc-magnesium pigment according to claim 1, wherein the platelet-shaped zinc-magnesium pigment comprises 45.6 to 57.8 mol % of Zn, 42.2 to 54.4 mol % of Mg and 0 to 7 mol % of at least one metal selected from the group consisting of Mn, Li, Be, Y, Sn, Al, Ti, Fe, Cu and mixtures thereof, based upon the total molar amount of Zn, Mg, Mn, Be, Y, Li, Sn, Al, Ti, Fe and Cu, wherein the molar percentages add up to 100 mol % and where Zn, Mg, Mn, Be, Y, Li, Sn, Al, Ti, Fe and Cu constitute at least 93% by weight of the zinc-magnesium pigment based upon the total weight thereof.

3. The platelet-shaped zinc-magnesium pigment according to claim 1, wherein the platelet-shaped zinc-magnesium pigment comprises less than 0.15 mol % of at least one metal selected from the group consisting of Mn, Li, Be, Y, Sn and mixtures thereof, based upon the total molar amount of Zn, Mg, Mn, Be, Y, Li, Sn, Al, Ti, Fe and Cu.

4. The platelet-shaped zinc-magnesium pigment according to claim 1, wherein the platelet-shaped zinc-magnesium pigment has a median thickness from a range from 90 nm to less than 700 nm.

5. The platelet-shaped zinc-magnesium pigment according to claim 1, wherein the platelet-shaped zinc-magnesium pigment has a median diameter $D_{50}$ from a range from 3 to 25 µm.

6. The platelet-shaped zinc-magnesium pigment according to claim 1, wherein the platelet-shaped zinc-magnesium pigment has an aspect ratio within a range from 10 to 200.

7. The platelet-shaped zinc-magnesium pigment according to claim 1, wherein the platelet-shaped zinc-magnesium pigment has an aspect ratio within a range from 15 to 75.

8. A plurality of platelet-shaped zinc-magnesium pigments according to claim 1, wherein the platelet-shaped zinc-magnesium pigments have a size distribution having a span ΔD according to formula (II)

$$\text{Span}\Delta D=(D_{90}-D_{10})/D_{50} \quad (II)$$

of 1.0 to 2.3.

9. The platelet-shaped zinc-magnesium pigment according to claim 1, wherein the zinc-magnesium pigments comprise 47.3 to 54.2 mol % of Zn, 45.8 to 53.7 mol % of Mg and 0 to 4.6 mol % of at least one metal selected from the group consisting of Mn, Li, Be, Y, Sn, Al, Ti, Fe, Cu and mixtures thereof, based upon the total molar amount of Zn, Mg, Mn, Be, Y, Li, Sn, Al, Ti, Fe and Cu, wherein the molar percentages add up to 100 mol %, the median thickness $h_{50}$ of the pigment is less than 700 nm, and where Zn, Mg, Mn, Be, Y, Li, Sn, , Ti, Fe and Cu constitute at least 93% by weight of the zinc-magnesium pigment, based on the total weight thereof.

10. The platelet-shaped zinc-magnesium pigment according to claim 1, wherein the platelet-shaped zinc-magnesium pigment has been obtained by mechanical forming by means of stirred ball mills as grinding unit.

11. An anticorrosion coating, wherein the anticorrosion coating comprises the platelet-shaped zinc-magnesium pigment of claim 1.

12. A coating for aircraft or coil coating, comprising the platelet-shaped zinc-magnesium pigment according to claim 1.

13. An article comprising the zinc-magnesium pigment of claim 1.

14. The article according to claim 13, wherein the article is selected from the group consisting of aircraft, ships, boats, motor vehicle bodies, buildings, facades, door and window frames, bridges, power masts and wind turbines.

15. The article according to claim 13, wherein the article comprises aluminium or an aluminium alloy.

16. A process for producing platelet-shaped anticorrosion pigments according to claim 1, wherein the process comprises:

mechanical forming of non-platelet-shaped zinc-magnesium pigments comprising 40.8 to 67.8 mol % of Zn, 32.2 to 59.2 mol % of Mg and 0 to 7 mol % of at least one metal selected from the group consisting of Mn, Li, Be, Y, Sn, Al, Ti, Fe, Cu and mixtures thereof, based upon the total molar amount of Zn, Mg, Mn, Be, Y, Li, Sn, Al, Ti, Fe and Cu, wherein the molar percentages add up to 100 mol %, and wherein an energy input of at least 2500 kJ per kg of platelet-shaped zinc-magnesium particles is effected at a rate of at least 600 kJ per kg of platelet-shaped zinc-magnesium particles per hour.

17. A process for protecting an article comprising aluminium or an aluminium alloy from corrosion, comprising coating the article with a coating comprising zinc-magnesium pigments according to claim 1.

18. An article comprising an anticorrosion coating of claim 11.

19. The article according to claim 13, wherein the article body consists of aluminium or an aluminium alloy.

\* \* \* \* \*

UNITED STATES PATENT AND TRADEMARK OFFICE
CERTIFICATE OF CORRECTION

PATENT NO. : 9,718,965 B2
APPLICATION NO. : 14/422441
DATED : August 1, 2017
INVENTOR(S) : Markus Rupprecht et al.

Page 1 of 1

It is certified that error appears in the above-identified patent and that said Letters Patent is hereby corrected as shown below:

In the Claims

Column 21, Line 17, Claim 9, delete "Sn, ," and insert -- Sn, AI, --

Signed and Sealed this
Seventh Day of November, 2017

Joseph Matal
*Performing the Functions and Duties of the*
*Under Secretary of Commerce for Intellectual Property and*
*Director of the United States Patent and Trademark Office*